Aug. 16, 1966 L. W. BLEIMAN 3,266,798

MEANS FOR RETURNING A RECORD CARD TO ITS STACK

Filed June 16, 1964 2 Sheets-Sheet 1

INVENTOR.
LEWIS W. BLEIMAN
BY
Samuel Cohen
Attorney

MEANS FOR RETURNING A RECORD CARD TO ITS STACK

Filed June 16, 1964 2 Sheets-Sheet 2

INVENTOR.
LEWIS W. BLEIMAN
BY
Samuel [signature]
Attorney

United States Patent Office 3,266,798

Patented August 16, 1966

3,266,798

MEANS FOR RETURNING A RECORD CARD TO ITS STACK

Lewis W. Bleiman, Northridge, Calif., assignor to Radio Corporation of America, a corporation of Delaware Filed June 16, 1964, Ser. No. 375,527
7 Claims. (Cl. 271—64)

This invention relates generally to card memories and, in particular, to a new and improved arrangement for returning a card to a deck of such cards.

An object of the invention is to provide an improved system for returning a rapidly moving card, such as a memory card, to a deck of such cards.

Another object of the invention is to provide an improved card return arrangement in which a common return track of channel may be employed for two decks of cards.

Another object of the invention is to provide an asynchronous system for returning a card to a deck of such card—asynchronous in the sense that the returning card itself actuates a mechanism for aligning the card with the remainder of the deck and for pushing the card into the remainder of the deck.

In the arrangement of the invention, there are two side-by-side decks with a space between them. The returning card passes through a single return track which is common to both decks and into the space between the decks. A sensing circuit produces an output signal in response to the return of the card, which actuates a mechanism which aligns the card with both decks. Means in the space between the decks is located on one side or the other of the returning card and, when the returning card is aligned with the decks, pushes the returning card into the desired one of the two decks.

The invention is discussed in greater detail below and is shown in the following drawings, of which:

Figure 1:
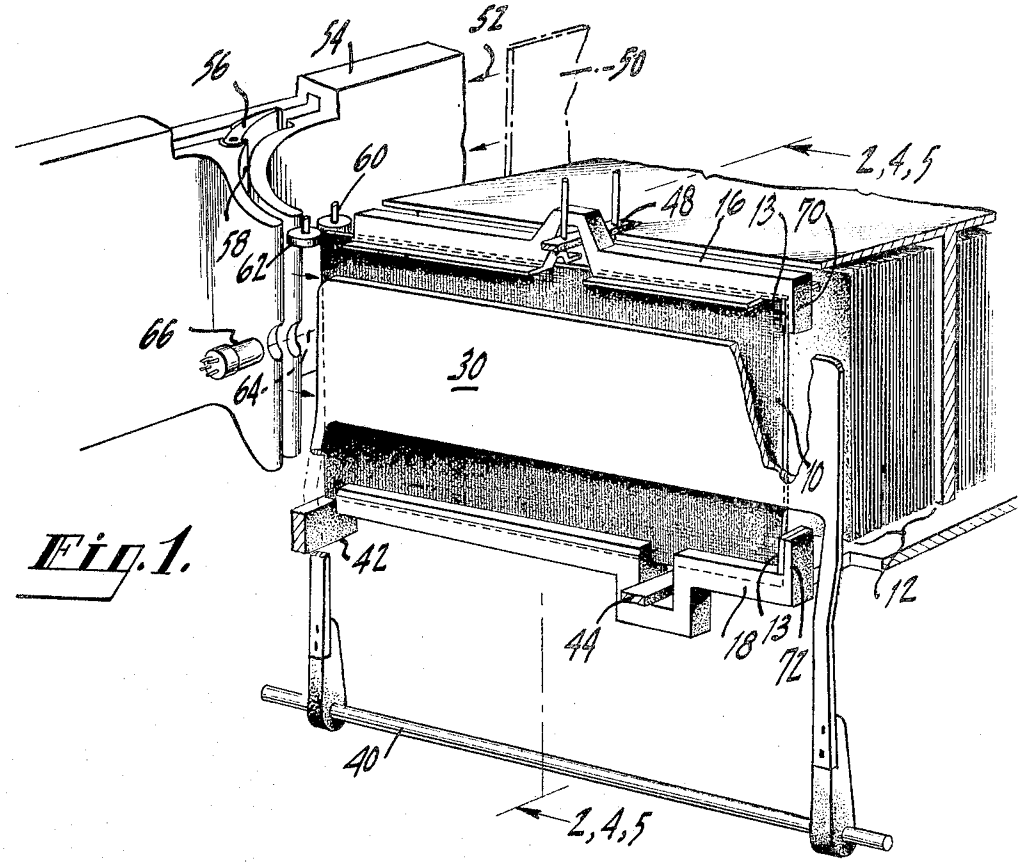
FIGURE 1 is a perspective, partially broken away view of an embodiment of the invention.

In the memory system embodying the invention, information is recorded on cards formed of Mylar and coated with magnetic material, one of which is shown at 10 in FIGURE 1. Each card is roughly 16″ x 4½″. Binary information is written on the cards by means of magnetic write heads (not shown), along parallel tracks extending in the direction of the long dimension of the card. However, it is to be understood that the present invention is equally applicable to other types of information storage cards.

In general, the cards may be coded at their top and/or bottom edges by notches or slots formed in the cards. The cards are stored in decks, as, for example, shown at 12 in FIGURE 1, and any card in any deck is randomly accessible. The way in which the cards may be selected is not part of the present invention, but is described in copending application Serial No. 308,012, filed September 10, 1963, by the present inventor and assigned to the same assignee as the present application. Suffice it to say the cards are selected by bars which bear against the coded edges of the card and cause a group of the cards to project slightly above the remainder of the deck. Then, all cards execept the desired card are pushed back into the deck. Then, a gripper bar engages the selected card and ejects it from the deck through the open right side of the magazine, as viewed in FIGURE 1. The ejected card passes into a track or raceway and is propelled by belts, rollers or the like to the read-write station. After the card is processed by reading information therefrom or writing information onto the card, it may be returned to the deck. The present invention is concerned with the card return mechanism.

For the purpose of drawing simplification, the various selector bars discussed briefly above are not shown. Further, the edge coding of the cards is not shown. Also, although the top and bottom of the magazine may be formed with openings for permitting the selector bars to engage the cards, since these play no part in the present description, they are not shown.

Figure 2:
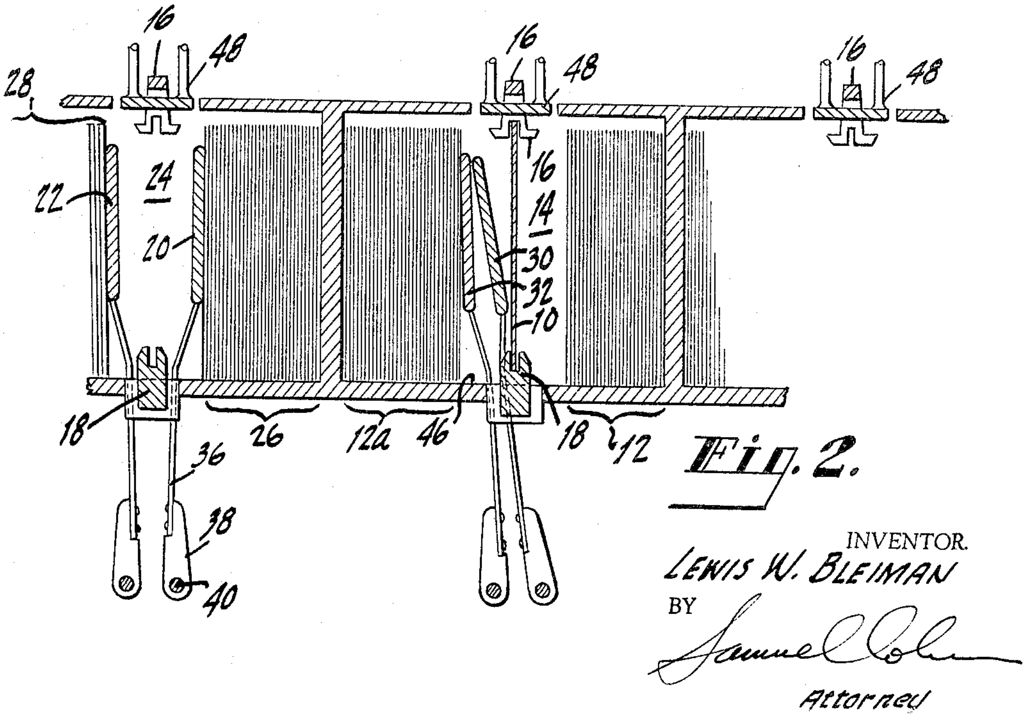
FIGURES 2, 4 and 5 are sections along line 2, 4, 5—2, 4, 5 of FIGURE 1, showing the various system components in different positions.

In the present arrangement, as illustrated in FIGURES 1 and 2, the decks of cards are arranged in pairs, such as 12 and 12*a*. There is a space 14 between the two decks of cards for receiving a returning card. An upper channel 16 and a lower channel 18 are located in this space. Their purpose is to guide the returning card as it enters the space 14.

There are two transfer plates in each card return space. The plates 20 and 22 (FIGURE 2) in the card return space 24 are shown in their relaxed position, holding the decks of cards 26 and 28 in place. The transfer plates 30 and 32 (FIGURE 2) are shown in their actuated position waiting to move a returning card 10 into the deck 12. Each transfer plate, as, for example, 20, is mounted by an arm 36 and coupling element 38 to a rod 40. When the rod 40 is rotated through a small angle by the transfer plate drive mechanism (not shown), the transfer plate is moved.

Card rests 42 and 44 (FIGURE 1) are located at the base of the card return space. The upper surfaces of these rests are aligned with the upper surface 46 of the bottom of the magazine. Card pusher element 48 located at the top portion of the return space is for the purpose of pushing the returning card against the card rests.

In the operation of the present card return arrangement, a returning card, shown in phantom view at 50 in FIGURE 1, travels in the direction of arrows 52 within the track 54. A gate element 56, when in the position shown, causes the card to travel into the common return track 58. When in the channel 54, the card is driven by rollers, belts, or the like (not shown) at relatively high speed.

The position of the card in the common return channel is slightly higher than the cards in the deck. When the leading edge of the card reaches the end of the common track 58, the card is engaged by the drive rollers 60, 62. The undersides of these drive rollers are located almost flush with the top of the deck. A beam of light, indicated by dashed line 64, which actuates a photo-cell 66, is interrupted when the card passes the photo-cell.

Turning for a moment to FIGURE 2, the transfer plates are normally in the position shown at 20, 22. However, prior to the time that a card is returned to the space between the two decks, the plates are moved selectively to the positions shown at 30, 32 in FIGURE 2 or to the positions shown in FIGURE 5. In the position 30, 32 shown in FIGURE 2, the returning card will be pushed into deck 12. In the position shown in FIGURE 5, the returning card will be pushed into deck 12*a*.

Returning to FIGURE 1, the drive rollers 60 and 62 drive the card along the upper and lower channels 16 and 18, into the space between the two decks. The card is about ¼″ above the cards in the decks, as is shown in FIGURE 2. The length of the card and the position of the drive rollers is such that any tendency for the card to bounce back when it reaches the rubber bumpers 13 located at the end portions 70 and 72 of the upper and lower channels 16 and 18 is counteracted. In other words, when the card bounces back, the drive rollers 60 and 62 engage the lagging edge of the card and again push the card against the bumpers.

Figures 4, 5, 6:
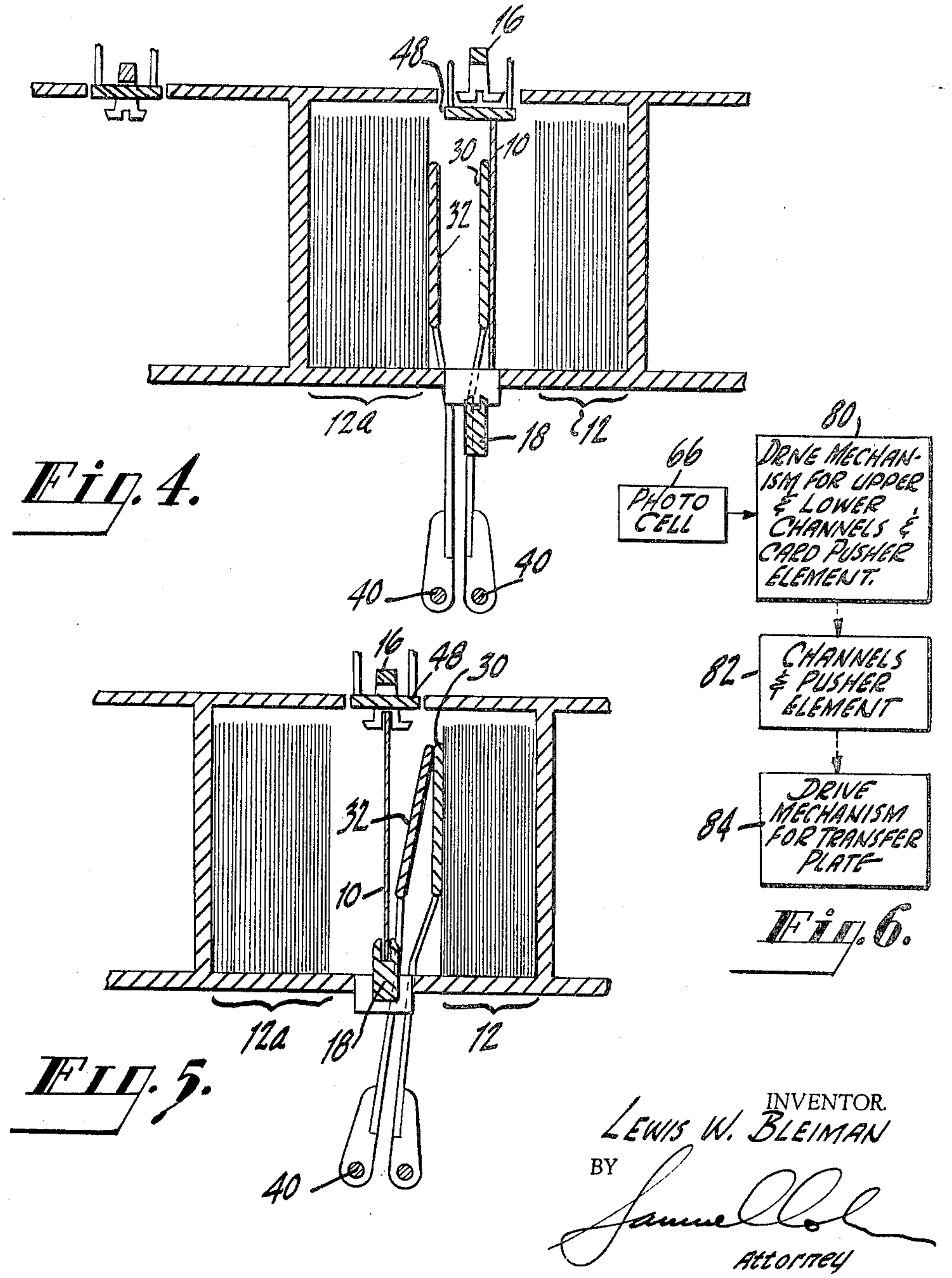
FIGURE 6 is a block circuit diagram of the channel and transfer plate drive mechanism of the present arrangement.

When the lagging edge of the card passes the photo-cell 66, the light beam 64 again reaches the photo-cell. The signal which results is employed to actuate the mechanism (not shown in FIGURES 1 or 2) for concurrently raising the upper channel 16 and lowering the lower channel 18, and lowering the pusher element 48. The positions of these elements immediately after these three operations are shown in FIGURE 4. The upper channel 16 is shown in its raised position; the lower channel 18 is shown in its lowered position; and the pusher bar 48 is shown in its lowered position.

The pusher bar pushes the card against the card rests 42 and 44 of FIGURE 1 aligning the card with the cards in the two decks 12 and 12*a*. When the pusher bar moves to its down position, it engages a mechanism such as microswitch or the like (not shown), which actuates the drive mechanism for the transfer plates. This causes the right transfer plate 30 of FIGURES 2 and 4 to move to the right, as is shown in FIGURE 4. When so moved, the transfer plate engages the card 10 and pushes it into the back of the deck 12. Thereupon, the upper channel 16 is lowered and the lower channel 18 is raised to their original positions, as shown in FIGURE 2, and the card pusher element 48 is also raised to its original position. The various elements now appear as shown at the left in FIGURE 2, the transfer plates 20 and 22 holding the decks in place.

In the operation of the present arrangement, it is generally desired to return a card to the same magazine from which it is selected. Accordingly, means are provided, after a card is selected, automatically to move the transfer plate associated with the deck from which the card is selected to a position such that it can return the card to the same deck. For example, when the selector bars for the deck 12 cause a card to be ejected from that deck, the transfer plate 30 is automatically moved to the position shown in FIGURE 2. On the other hand, when a card is selected from deck 12*a*, the transfer plate 32 is automatically moved to a position such as shown in FIGURE 5.

Figure 3:
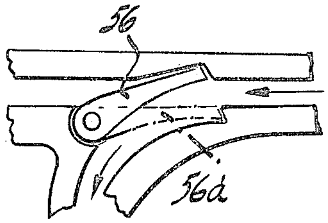
FIGURE 3 is an enlarged plan view of a gate mechanism of FIGURE 1.

While only a few magazines are shown to keep the drawing simple, it is to be understood that there may be a substantial number of magazines, for example, 24 or 48 or more. The gate element 56, which is under the control of the control unit of the data processing system (not shown), determines the magazine to which the returning card goes. In the position shown in FIGURE 1, the returning card moves into the space occupied by the transfer plate 30. When the gate is moved to the position shown by dashed lines 56*a* in FIGURE 3, the card continues to travel in the main track to another magazine.

A simplified block circuit diagram showing some of the electrical and mechanical interconnections appears in FIGURE 6. Block 66*a*, legended photo-cell, may include a circuit such as a differentiator and threshold circuit for translating the transition from the no-light to light receiving condition of the photo-cell to a pulse, and an amplifier for raising the power level of the pulse. When the lagging edge of the card passes the photo-cell and it again receives light, it applies an output signal to the drive mechanism for the upper and lower channels and the card pusher element designated generally by the block 80. These drive mechanisms are actuated by the signal to drive the channel and pusher elements which are designated generally by the block 82. The channels or pusher elements may engate a microswitch located at the end of the path through which they travel, which microswitch actuates the drive mechanism for the transfer plate, indicated generally at 84. This drive mechanism causes a transfer plate to move the returned card into the deck. Thereafter, after a predetermined time interval, the drive mechanism 80 may automatically be actuated to return the channels and pusher elements to their original positions.

What is claimed is:

1. In combination,
a card magazine arranged to store two decks of cards, side by side, with a space between the decks;
upper and lower channels located in the space between the decks for receiving a returning card; and
means responsive to the arrival of a returned card for withdrawing the upper and lower channels from their card-receiving position, after the card has been received, and for moving the card into one of the two decks.

2. In combination,
a card magazine arranged to store two decks of cards, side by side, with a space between the decks;
upper and lower channels located in the space between the decks for engaging the edges of a returning card and thereby guiding the card; and
means responsive to the arrival of a returned card for withdrawing the upper and lower channels from their card-receiving position, after the card has been received, thereby leaving the card free for sideways movement, and for moving the card sideways into one of the two decks.

3. In combination,
a card magazine arranged to store two decks of cards, side by side, with a space between the decks;
upper and lower channels located in the space between the decks for engaging the edges of a returning card and thereby guiding the card, said channels being located to guide the card to a position out of alignment with the decks;
means for withdrawing the upper and lower channels from their card-receiving position, after the card has been received, thereby leaving the card free for movement;
means for moving the returned card in the direction of the plane of the card, when the upper and lower channels are withdrawn, for aligning the returned card with the two decks; and
means for moving the returned card in a direction perpendicular to the plane of the card and into position as the last card in one of the decks.

4. In combination,
a card magazine arranged to store two decks of cards, side by side, with a space between the decks, and formed with an opening communicating with said space through which a returning card passes, end on;
upper and lower channels located in the space between the decks and communicating with said opening for engaging the edges of a returning card and thereby guiding the card; and
means responsive to the arrival of a returned card for withdrawing the upper and lower channels from their card-receiving position, after the card has been received, thereby leaving the card free for movement, and for moving the card sideways into one of the two decks.

5. In combination,
a card magazine arranged to store two decks of cards, side by side, with a space between the decks;
upper and lower channels located in the space between the decks for engaging the edges of a returning card and thereby guiding the card, said channels being located to guide the card to a position out of alignment with the decks;
means for withdrawing the upper and lower channels from their card-receiving position, after the returning card has been received, thereby leaving the edges of the card disengaged and the card free for movement;
a bar located at an edge of the card for pushing against said edge and moving the returned card in the direction of the plane of the card, when the upper and lower channels are withdrawn, for aligning the returned card with the two decks; and a plate which engages a face of the card for moving the returned card in a direction perpendicular to the face of the card and into position as the last card in one of the decks.

6. In combination, a card magazine arranged to store two decks of cards, side by side, with a space between the decks;

upper and lower channels located in the space between the decks for engaging the edges of a returning card and thereby guiding the card, said channels being located to guide the card to a position slightly above the decks;

means responsive to the return of a card for withdrawing the upper and lower channels from their card-receiving position, after the card has been received, thereby leaving the card out of engagement with the channels and free for movement;

means responsive to the return of said card for pushing down on an edge of the returned card to move the returned card in the direction of the plane of the card, thereby to align the returned card with the two decks; and a transfer plate for engaging the face of the returned card, after it is in proper alignment, for moving the returned card in a direction perpendicular to said face of the card and into position as the last card in one of the decks.

7. In combination, a card magazine arranged to store two decks of cards, side by side, with a space between the decks;

upper and lower channels located in the space for receiving the returning card;

means in the space between the decks for moving the upper and lower channels out of their card-receiving position and for aligning a returned card formerly in the channels with the decks; and card transfer means for engaging the aligned card and pushing it into one of the two decks.

References Cited by the Examiner

UNITED STATES PATENTS

| | | | |
|---|---|---|---|
| 2,860,554 | 11/1958 | Shields | 271—64 X |
| 3,051,477 | 8/1962 | Pavlic | 271—64 X |
| 3,126,008 | 3/1964 | Geddes | 129—16.1 |

FOREIGN PATENTS

| | | |
|---|---|---|
| 675,117 | 7/1952 | Great Britain. |

M. HENSON WOOD, Jr., *Primary Examiner.*

A. N. KNOWLES, *Assistant Examiner.*